United States Patent [19]
Hutchison et al.

[11] Patent Number: 5,099,714
[45] Date of Patent: Mar. 31, 1992

[54] RACK AND PINION STEERING MECHANISM

[75] Inventors: Wayne R. Hutchison, Mayville; Richard D. Teal, Horicon; David A. Skriba, Mayville, all of Wis.; Steven C. Wasson; David R. Daniel, both of Midland, Mich.

[73] Assignee: Deere & Company, Moline, Ill.

[21] Appl. No.: 715,171

[22] Filed: Jun. 14, 1991

[51] Int. Cl.$^5$ .............................................. B62D 3/12
[52] U.S. Cl. ...................... 74/422; 74/89.17; 74/492
[58] Field of Search ................ 74/89.17, 89.18, 422, 74/492, 493, 498

[56] References Cited

U.S. PATENT DOCUMENTS

| | | | |
|---|---|---|---|
| 2,614,436 | 10/1952 | Wahlberg | 74/490 |
| 3,665,771 | 5/1972 | Blatt | 74/422 X |
| 3,747,429 | 7/1973 | Cass | 74/492 |
| 3,762,240 | 10/1973 | Adams | 74/498 |
| 3,795,094 | 3/1974 | Mollen et al. | 74/197 X |
| 4,028,957 | 6/1977 | Wright | 74/498 X |
| 4,279,170 | 7/1981 | Righi et al. | 74/422 X |
| 4,441,735 | 4/1984 | Hutchison et al. | 74/498 X |
| 4,501,218 | 2/1985 | Teraura et al. | 74/498 X |
| 4,724,717 | 2/1988 | Chikuma | 74/422 X |

FOREIGN PATENT DOCUMENTS 37727 1/1931 France .................. 74/422

OTHER PUBLICATIONS

John Deere Horicon Works, entitled "SRX75 and SRX95 Riding Mowers Operator's Manual", published in 1990, front cover and p. 89.

Primary Examiner—Leslie A. Braun
Assistant Examiner—William O. Trousdell

[57] ABSTRACT

A rack and pinion steering mechanism for use with a vehicle having a frame, an operator station and steerable ground engaging wheels. The mechanism provides a steering wheel, a steering column, a pinion gear coupled with the steering column, and a rack gear plate member having an opening for receiving the pinion gear. The opening has a laterally extending toothed portion engagable with the pinion gear, and has laterally outward end portions engagable with the pinion gear for limiting the lateral shifting of the rack gear plate member. A support plate is coupled with the frame and is abuttable with the rack gear plate member for securing the rack gear plate member between the support plate and frame for maintaining the rack gear teeth in operative engagement with the pinion gear.

27 Claims, 4 Drawing Sheets

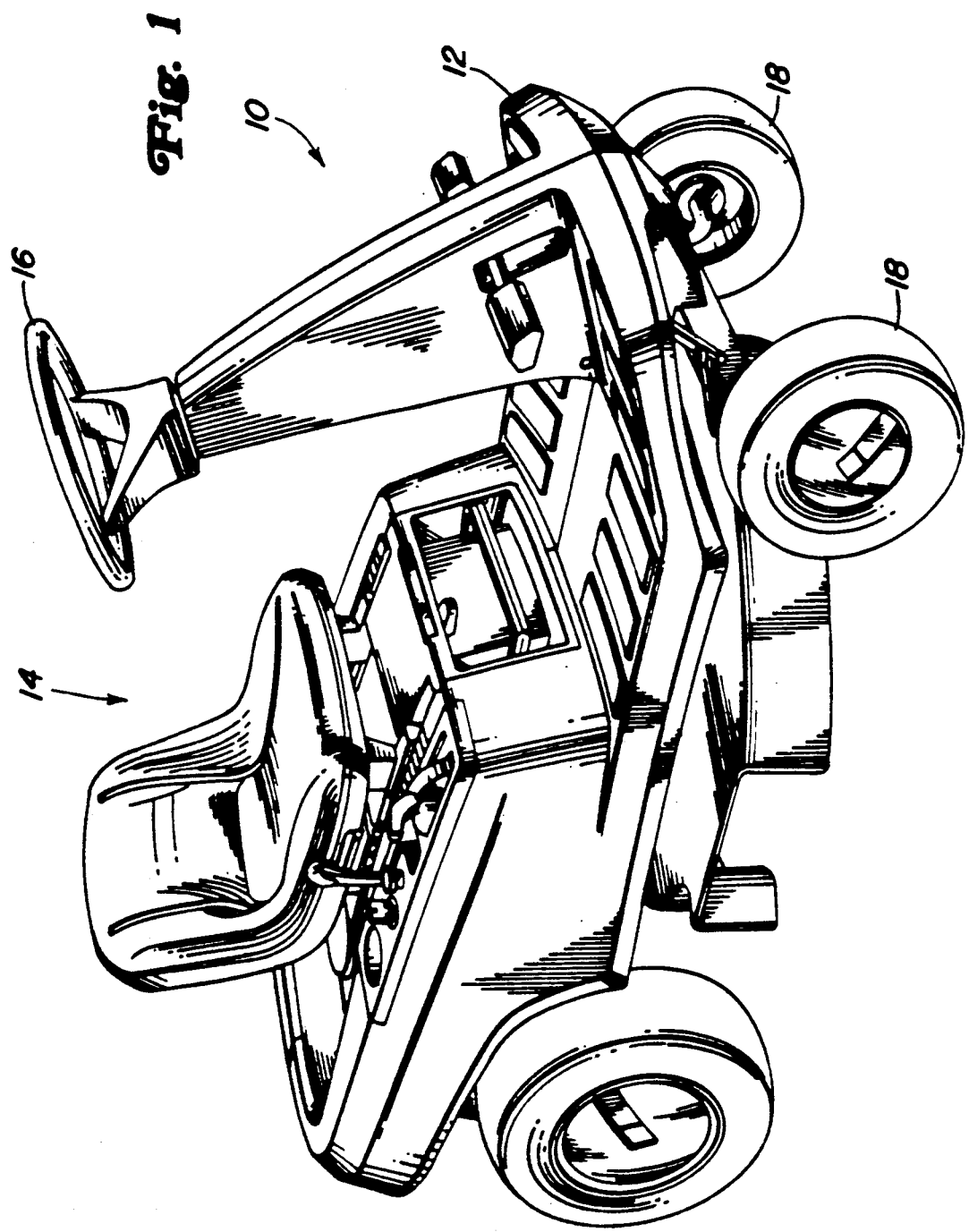

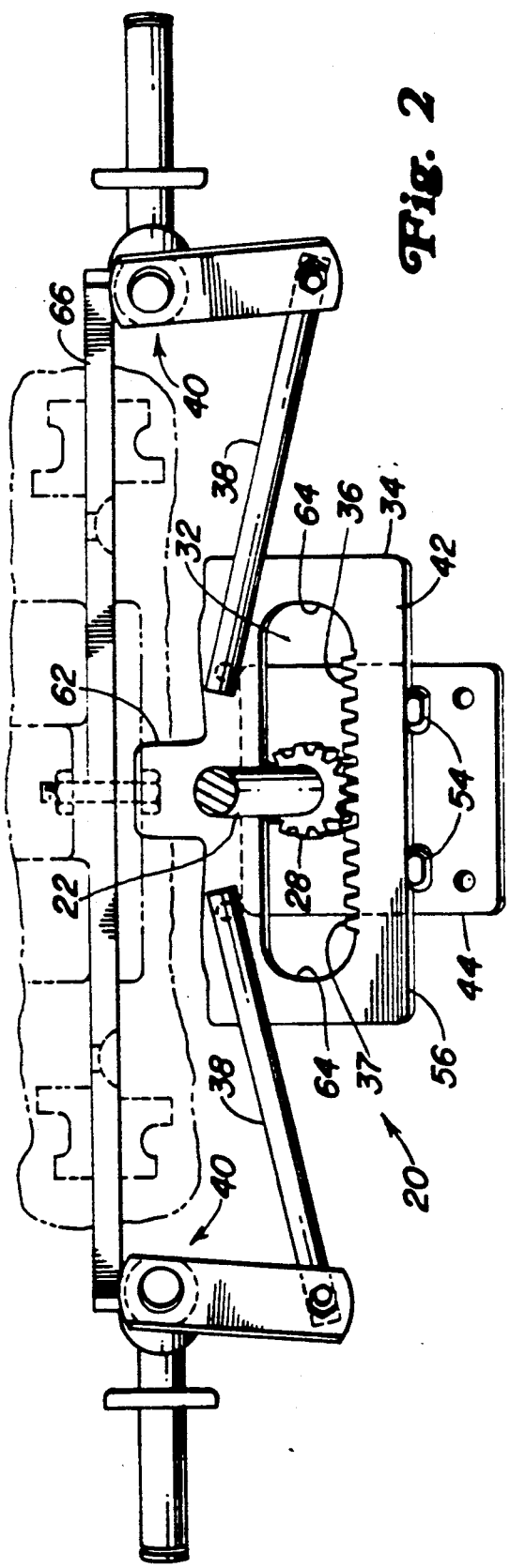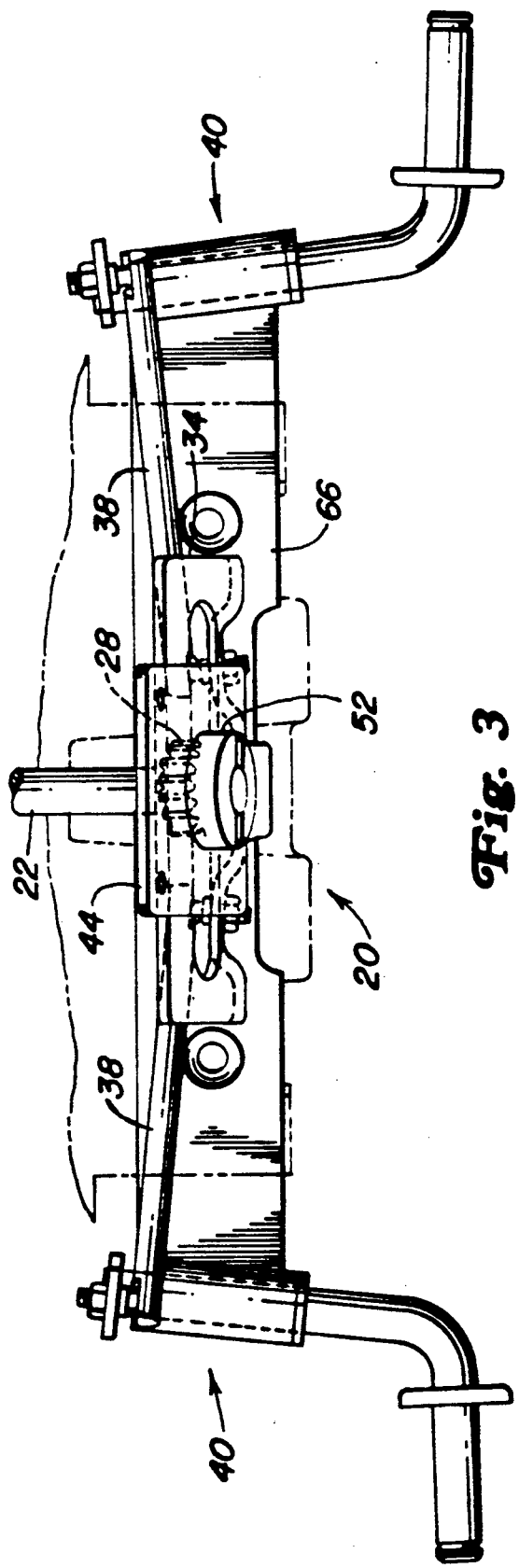

RACK AND PINION STEERING MECHANISM

BACKGROUND OF THE INVENTION

1. Field of the Invention

The invention relates to steering mechanisms as used with relatively small lawn tractors or grass mowing vehicles.

2. Description of the Related Art

Lawn tractors or mowing vehicles typically operate on ground surfaces such as grass or turf that are easily damaged or scuffed by the wheels of the vehicle Such scuffing can occur as the vehicle wheels skid laterally instead of rolling forwardly. When a vehicle having two steerable wheels executes a turn, one of the steered wheels may be skidding slightly laterally. A wheel may skid slightly when the axes of rotation of the vehicle's ground engaging wheels do not intersect at a common point. Such inaccuracies in the execution of a turn are generally caused by the vehicle's steering mechanism.

Many lawn vehicles provide pinion and sector steering mechanisms. A pinion gear is coupled for rotation with the steering column and engages an arcuate sector gear. As the steering column and sector gear rotate, the sector gear swings about a pivotal coupling with the vehicle. Tie rods are operatively coupled with the sector gear, and transfer the movement of the sector gear to the ground engaging steered wheels. However, many pinion and sector steering mechanisms are relatively inaccurate, and therefore can cause scuffing of the ground, particularly in tight cornering. These inaccuracies are caused in large part by the point of connection between the tie rods and the sector gear being shifted longitudinally as well as laterally as the sector gear rotates.

In an attempt to reduce the steering errors associated with pinion and sector mechanisms, sector gears having relatively large radii have been provided to reduce the longitudinal shifting of the tie rods as the sector rotates. However, increasing the size of the sector also increases the weight, complexity and cost of the mechanism.

Many automobiles provide rack and pinion steering mechanism, which generally provide better turning accuracy than sector-pinion mechanisms. A rack gear having a straight or non-curved toothed portion engages the pinion. Rack gears may be conceptualized as a sector gear having an infinite radius, such that the gear teeth are arranged in a straight line. Since the rack gear teeth are aligned in a straight line, the rack gear will shift laterally in response to rotation of the pinion gear and will have no component of motion in the longitudinal direction. Therefore, the point at which the tie rods are coupled to the rack gear will not shift longitudinally during a turn, and turning accuracy is generally enhanced.

However, the rack and pinion steering mechanisms used with automobiles are generally unfeasible for use with lawn vehicles. Prior art rack and pinion mechanisms used with automobiles typically have a large housing for enclosing the rack gear and pinion gear in a lubricated environment. Such housings have a relatively large number of parts, and are relatively heavy and costly. Automotive type housings are typically too large to be carried within the small compartments provided by lawn and garden tractors. Mechanisms are often provided within the automotive type housings for limiting the angle at which the steerable wheels can be turned. Maintenance is required to keep the contents of the housing lubricated. Bearing support mechanisms must be provided within the housing for accurately maintaining the rack gear in meshed engagement with the pinion gear. The small tolerances involved in the use of such bearing support mechanisms significantly increases the cost of the steering mechanism. The rack and pinion steering mechanisms used in automobiles are generally too costly, complicated, and heavy to be feasible for use with lawn vehicles.

In addition, automobile rack and pinion gear mechanisms typically provide tie rods that extend from the laterally outer edge portions of the rack gear to the steerable wheels. As the rack gear shifts laterally during execution of a turn, the tie rods shift to pivot the steerable wheels. Since the tie rods are connected to the outer edges of the rack gear, the automobile type rack and pinion mechanisms are relatively wide, and are therefore generally unsuitable for use with relatively narrow lawn and garden vehicles.

Many small lawn vehicles provide a front axle that pivots about a connection at the centerline of the vehicle. The front steerable wheels are pivotally carried at the outer edges of the pivotal axle. The axle pivots about the central connection with the vehicle to allow the front wheels to remain in contact with the ground when ground surface undulations or side slopes are encountered. As the axle and steerable wheels pivot about the center of the vehicle to ride over a side slope, the tie rods remain fixed to the rack gear, and therefore cause the steerable wheels to turn slightly as undulations are encountered. These steering inaccuracies, referred to as dynamic steering errors, may cause the turf beneath the tires to be undesirably scuffed. Dynamic steering errors can be reduced by coupling the tie rods to the steering mechanism near the point about which the axle and wheels pivot to ride over ground undulations. Therefore, for a vehicle with a front axle having a central pivot axis, the optimal location for coupling the tie rods to the rack gear would be near the center of the vehicle. However, automotive type rack and pinion mechanisms typically couple the tie rods to the outer edges of the rack gear, and therefore would create relatively large dynamic steering errors. The automotive type of rack and pinion mechanism is therefore generally unsuitable for use with small lawn vehicles having a front axles pivotable about a central point.

It may be desirable to provide a vehicle with a frame structure having generally enclosed box structures that serve to strengthen the frame structure. Such a frame structure might not provide access to the interiors of the enclosed boxes, and therefore may prevent certain vehicle components from being assembled or attached to the interior of the vehicle frame. Conventional steering mechanisms therefore may not be capable of being assembled or attached to frames having generally enclosed and inaccessible box structures.

Therefore, it would be desirable to provide a steering mechanism of the rack and pinion type that is comprised of few parts and is inexpensive to manufacture, and that is adapted for use with small lawn vehicles. It would be desirable for such a mechanism to be carried by the vehicle in such a way that no complex or costly housing structure is needed. It would also be desirable for the rack gear of such a mechanism to be secured in meshed relationship with the pinion gear in such a way that complicated and costly bearing support structures are not required. It would be desirable for such a mechanism to be adapted for use on a relatively narrow vehicle such as a lawn and garden vehicle. It would be desirable to provide such a steering apparatus with a mechanism for limiting the extent to which the steerable wheels can be turned, and that reduces or eliminates dynamic steering errors. It would also be desirable to provide a steering mechanism capable of being assembled on a vehicle having generally enclosed or inaccessible box structures formed by the vehicle frame.

SUMMARY OF THE INVENTION

A rack and pinion steering mechanism is provided for use with a vehicle for operation in a grassy environment. The mechanism provides a pinion gear coupled with a steering shaft. According to the preferred embodiment, the pinion gear is received by an opening formed in a rack gear plate member. The opening has a laterally extending toothed portion for engaging the pinion gear. Tie rod means are coupled between the rack gear plate member and pivotable wheel supports. As the steering shaft rotates, the pinion gear pivots to shift the rack gear plate member laterally. The tie rods shift laterally with the rack gear plate member, and turn the pivotable wheel supports to execute a vehicle turn. As the steering shaft continues to rotate to perform a tighter and tighter turn, the laterally outward end portions of the opening in the rack gear plate member will shift laterally to abut the pinion gear. The laterally outward end portions thereby define the extreme turning limits of the vehicle. The rack gear plate member extends a substantial distance along first and second surfaces in a direction perpendicular to the rack gear plate member's path of lateral shifting, such that the mechanism for supporting the rack gear plate member in meshed relation with the pinion gear is simple in construction and relatively inexpensive to manufacture.

BRIEF DESCRIPTION OF THE DRAWINGS

FIG. 1 is a view of a vehicle with which the present invention may be used.

FIG. 2 is a plan view of the preferred embodiment of the present invention.

FIG. 3 is a front view of the preferred embodiment with the frame of the vehicle not shown.

DESCRIPTION OF THE PREFERRED EMBODIMENT

Figure 4:
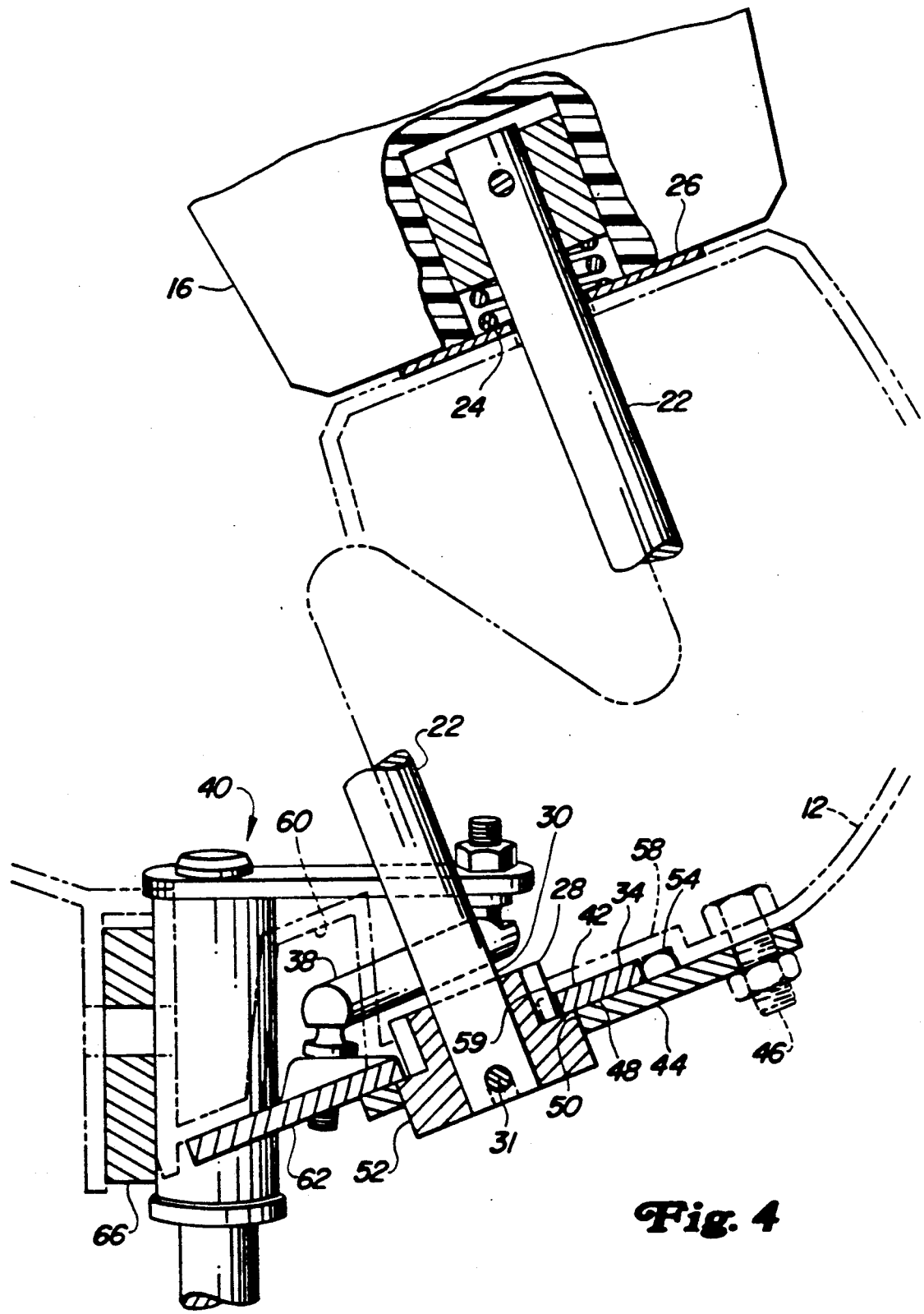
FIG. 4 shows the preferred embodiment of the present invention as viewed in section from the side of the vehicle.

Referring to FIG. 1, there is shown a vehicle 10 with which the present invention may be used. The vehicle 10 has a frame 12 that carries an operator station 14 at which the operator manipulates a steering wheel 16 and other controls to drive and direct the vehicle 10. A pair of steerable ground engaging wheels 18 are also provided.

Looking now to FIGS. 2, 3 and 4, there is shown a steering mechanism 20 according to the preferred embodiment of the present invention. Means is provided for transferring rotational motion from the steering wheel 16 to the ground engaging steerable wheels 18. A steering column 22, as best seen in FIG. 4, is coupled for rotation with the steering wheel 16, and extends downwardly from the operator station 14. A spring 24 carried by the steering column 22 is compressed between the steering wheel 16 and a wall 26 formed in the operator station 14. The spring 24 thereby biases the steering wheel 16 and steering column 22 upwardly. A pinion gear 28 is rigidly fixed to the lower portion 30 of the steering column 22 via a pin connection 31. The pinion gear is positioned within an opening 32 in a rack gear plate member 34 for engagement with a laterally extending toothed portion 36 formed by the opening 32. The toothed portion 36 is formed in a first laterally extending edge portion 37 of the rack gear plate member 34. As the steering wheel 16, steering column 22 and pinion gear 28 rotate, the rack gear plate member 34 shifts laterally. Tie rods 38 are coupled with the rack gear plate member 34 and extend laterally outwardly to pivotable wheel supports 40. As the rack gear plate member 34 shifts laterally, the tie rods 38 thereattached also shift laterally to pivot the pivotable wheel supports 40 such that the vehicle 10 executes a turn.

Means is provided for supporting the steering mechanism 20 and operatively securing it to the vehicle frame 12. A first surface 42 of the rack gear plate member 34 is pressed upward in slidable abutment with the frame 12 by a support plate means 44. The support plate means 44 is coupled beneath the frame 12 via bolts or clip nuts 46, and engages a second surface 48 of the rack gear plate member 34 to slidably secure the rack gear plate member 34 upwardly against the frame 12. The support plate means 44 defines an orifice 50, as best seen in FIG. 4, within which is carried a circular shoulder portion 52 formed integral with the pinion gear 28. The shoulder portion 52 is adapted for rotation within the orifice 50, and is confined within the orifice 50 to thereby prevent the pinion gear 28 and steering column 22 from shifting in the longitudinal or transverse directions. The shoulder portion 52 abuts against the second surface 48 of the rack gear plate member 34 for preventing the pinion gear 28, and steering column 22 from shifting upwardly, thereby maintaining the pinion gear 28 in mesh with the teeth 36 of the rack gear plate member 34. Projections 54 are formed in the support plate means 44 and abut a laterally extending edge portion 56 of the rack gear plate member 34 during operation. The projections 54 prevent the rack gear plate member 34 from shifting forwardly out of engagement with the pinion gear 28 as the pinion gear 28 rotates during execution of a turn.

The frame 12 according to the preferred embodiment is formed to define an offset portion 58 within which the rack gear plate member 34 is positioned, as seen in FIG. 4. An opening 59 is defined in the frame within which the steering column 22 and pinion gear 28 are positioned during operation. Also, a transversely extending channel 60 is formed in the frame 12 to create clearance for the tie rods 38 as they shift laterally. A tab 62 is formed at the rear of the rack gear plate member 34 and extends across the channel 60 to slidably abut the frame 12 rearwardly of the channel 60.

A pivotal front axle 66 is swingably coupled with the frame 12 at the vehicle's centerline. The pivotable wheel supports 40 are welded or otherwise coupled to the outer portions of the front axle 66. As the front wheels 18 encounter side slopes the axle 66 will pivot to allow both steerable front wheels 18 to remain in contact with the ground.

Next, the operation of the preferred embodiment of the present invention will be discussed. When the operator wishes to execute a turn he must turn the steering wheel 16 located in the operator station 14. As the steering wheel 16 rotates, so does the steering column 22, pinion gear 28 and shoulder portion 52. The pinion gear 28 is in mesh with the teeth 36 of the rack gear plate member 34, and will therefore cause the rack gear plate member 34 to shift laterally as the pinion gear 28 rotates. When the pinion gear 28 rotates, the rack gear plate member 34 will be urged to shift forwardly out of engagement with the pinion gear 28. This separation force is overcome by the presence of the projections 54 that abut the rack gear plate member 34 and hold the rack gear plate member 34 in meshed engagement with the pinion gear 28. Similarly, the pinion gear 28 tends to shift rearwardly away from engagement with the teeth 36 of the rack gear plate member 34 as the pinion gear 28 rotates. However, the shoulder portion 52 is confined within the orifice 50 of the support plate 44, and thereby prevents the pinion gear 28 from shifting rearwardly out of meshed engagement with the rack gear plate member 34. Therefore, the pinion gear 28 and rack gear plate member 34 are held together between the projections 54 and the rearward portion of the orifice 50 in the support plate means 44. The support plate means 44 therefore absorbs the separation forces during execution of a turn without transferring much force to the frame 12 through the clip nuts 46.

As the rack gear plate member 34 shifts laterally in response to rotation of the steering wheel 16 and pinion gear 28, the tie rods 38 will shift laterally. The pivotable wheel supports 40 coupled with the tie rods 38 thereby pivot the ground engaging wheels 18, and the vehicle 10 executes a turn.

If the operator continues to turn the steering wheel 16, the ground engaging wheels 18 will continue to pivot, and a turn of smaller radius will be executed. As the operator continues to turn the steering wheel 16, the rack gear plate member 34 will shift further and further laterally until one of the laterally outward end portions 64 defined by the opening 32 abuts the pinion gear 28. As the laterally outward end portion 64 of the opening 32 abuts the pinion gear 28, the ground engaging wheels 18 will be prevented from pivoting further. When this happens, the operator will be unable to turn the steering wheel 16 any further. A minimum turning radius is thereby established as the pinion gear 28 abuts the laterally outward end portion 64 of the opening 32. Therefore, the structure of the rack gear plate member 34 provides a simple and inexpensive mechanism for defining a minimum turning radius.

During operation, vibrational as well as other operating forces may urge the rack gear plate member 34 to pivot or twist about a transversely extending horizontal axis. However, the support plate means 44 acts to secure the rack gear plate member 34 upwardly against the frame 12 in meshed relation with the pinion gear 28, and thereby blocks the rack gear plate member 34 from pivoting about a transverse axis. The rack gear plate member 34 according to the preferred embodiment extends both fore and aft of the pinion gear 28 a substantial distance along the first and second surfaces in a direction perpendicular to the rack gear plate member's lateral path of travel. More specifically, the rack gear plate member according to the preferred embodiment has a longitudinal length of approximately 115 millimeters. The support plate means 44 can therefore abut the rack gear plate means 34 over a relatively great longitudinal distance, such that less precisely formed parts can be used to secure the rack with the same degree of precision. Therefore, since the rack gear plate member 34 of the present invention abuts the frame over a substantial distance to be held against rotation about a transverse axis, the mechanism that secures the rack gear plate member can be manufactured with larger tolerances and still hold the rack gear plate member 34 securely. In addition, since the surface areas of the support plate means 44 and frame 12 that contact and hold the rack gear plate member 34 are relatively large, materials having relatively low strength can be used to manufacture the frame 12, rack gear plate member 34 and support plate means 44. The cost of the steering mechanism 20 can thereby be reduced.

The preferred embodiment provides a rack gear plate 34 having an opening 32 for receiving the pinion gear 28 and steering column 22 and therefore provides laterally extending structure on both the fore and aft sides of the steering column 22. The rear portion of the rack gear plate therefore provides locations whereat the tie rods 38 may be coupled with the rack gear plate 34 near the centerline of the vehicle 10. By coupling the tie rods 38 to the rack gear plate 34 proximate the centrally located pivot axis of the front axle 66, dynamic steering errors are reduced.

The rack gear plate member 34 according to the preferred embodiment is described as having first and second surfaces that are flat. However, curved surfaces could also be provided according to the present invention. Also, the rack gear plate member according to the preferred embodiment is positioned in engagement with the pinion gear at an angle approximately 90° C. from the axis of rotation of the steering column. The rack gear plate member of the present invention could also be positioned at angles other than 90° from the steering column.

The steering column 22 according to the preferred embodiment is supported within the frame 12 by the spring 24. The spring 24 is in compression between the steering wheel 16 and a plate or wall 26 carried by the frame 12. The spring 24 prevents the steering column 22 from shifting downwardly along its axis of rotation. The shoulder portion 52 formed integral with the pinion gear 28 and carried by the steering column 22 abuts the lower or second surface 48 of the rack gear plate member 34 to block or prevent the steering column 22 from shifting upwardly along its axis of rotation under the force of the spring 24. The spring 24, shoulder portion 52 and rack gear plate member 34 therefore provide a mechanism requiring few parts for securing the steering column 22 against shifting along the steering column's axis of rotation.

The preferred embodiment provides the rack and pinion mechanism positioned forwardly of the pivotal wheel supports 40. The rack and pinion mechanism could also be positioned behind the pivotal wheel supports 40. The plan view of such a mechanism is as shown above in FIG. 2, except with the front of the vehicle being at the top of the page, rather than at the bottom of the page.

The preferred embodiment of the present invention is described as being coupled beneath the frame 12 of the vehicle 10. Since the mechanism according to the preferred embodiment is coupled to the underside of a frame 12, it is capable of being installed beneath a vehicle 10 having a hollow frame structure whose interior is inaccessible during the process of attachment.

Figure 5:
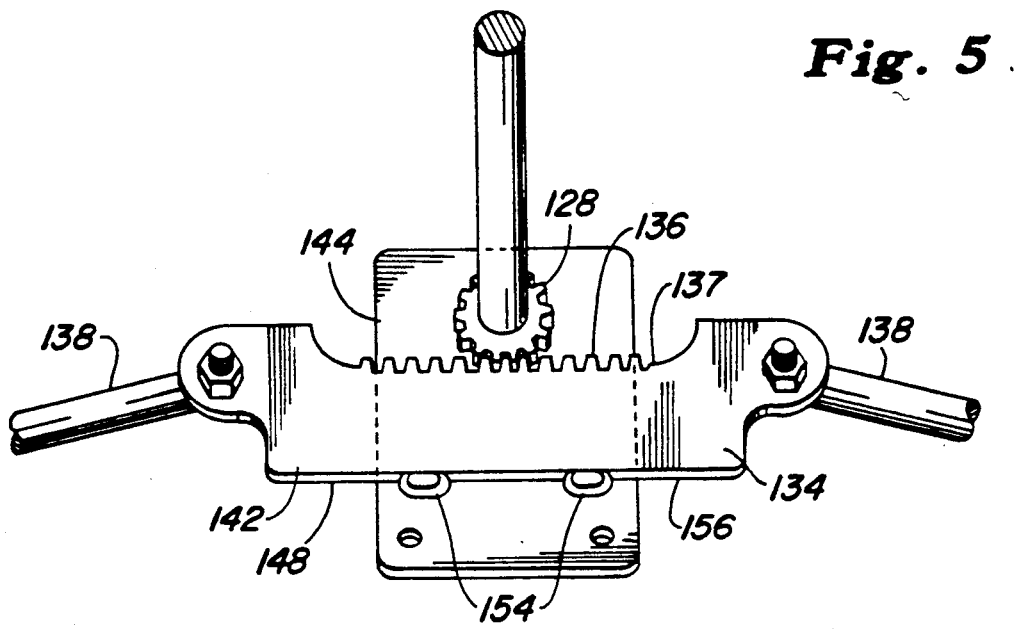
FIG. 5 is a plan view of a first alternative embodiment of the present invention.

An alternative embodiment of the present invention is shown in FIG. 5. A rack gear plate 134 is provided having a toothed portion 136 formed in its laterally extending rearward edge 137. The embodiment shown in FIG. 5 does not include an opening in the rack gear plate member, but rather defines a toothed portion 136 in the rearward laterally extending edge 137 of the rack gear plate member 134. The rack gear plate member 134 extends forwardly a relatively large or substantial distance along its first and second surfaces 142 and 148, and does not extend on both sides of the steering column. The large area of the rack gear plate member 134 allows the mechanism that supports the rack gear plate 134 to be simply constructed and comprised of relatively weak, inexpensive materials. Projections 154 carried by the support plate means 144 abut a second laterally extending edge 156 of the rack gear plate member 134 to resist the separation forces that develop during steering operations. This alternative embodiment may be desirable for use with vehicles having tie rods 138 that are to be coupled with the rack gear plate member directly to the side of, or forwardly of the steering column. Since this alternative embodiment extends forwardly from the pinion gear 128 and not rearwardly, this alternative embodiment may be advantageous when vehicle components occupy or fill the space within the vehicle directly behind the pinion gear.

Figure 6:
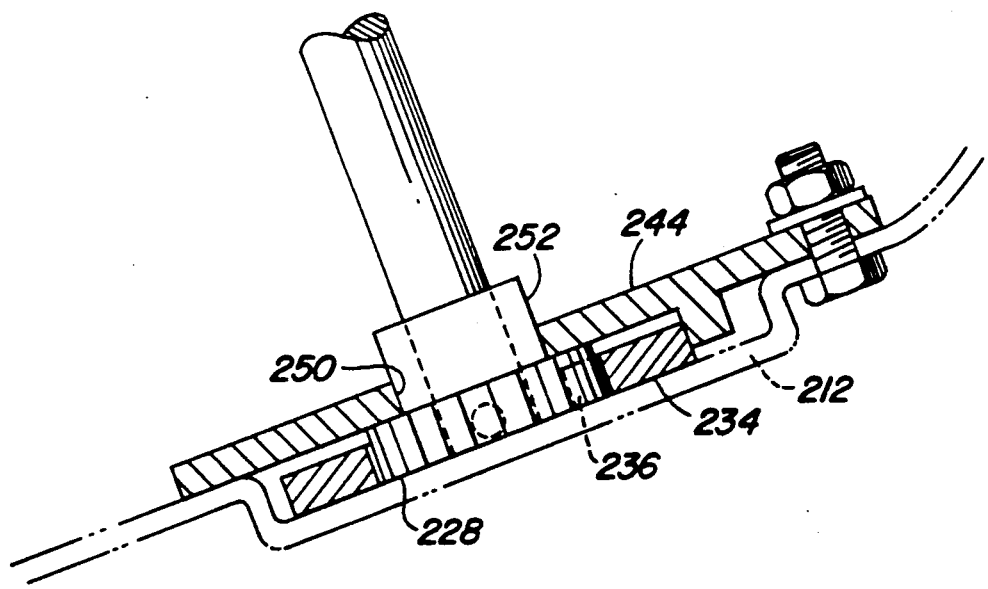
FIG. 6 is a side view of a second alternative embodiment of the present invention.

Another alternative embodiment is shown in FIG. 6, and is adapted for attachment above a vehicle frame 212. The rack gear plate member 234 is held downwardly in slidable abutment with the frame 212 by the support plate means 244. The pinion gear 228 is positioned beneath the support plate means 244, and engages the teeth 236 of the rack gear plate member 234. The shoulder portion 252 is rotatably received by the orifice 250 formed in the support plate means 244. The pinion gear 228 abuts the support plate 244 for preventing the pinion gear 228 from shifting upwardly out of engagement with the rack gear plate member 234. The embodiment of FIG. 6 may be desirable for use with a vehicle having a frame structure whose interior is accessible during the manufacturing process.

I claim:

1. A rack and pinion steering mechanism, said mechanism being adapted for use with a vehicle having a frame, an operator station, and steerable ground engaging wheels, comprising:
   a rotatable steering wheel positioned within the operator station of the vehicle;
   a steering column coupled for rotation with the steering wheel, and having an axis of rotation;
   a pinion gear coupled for rotation with the steering column;
   a rack gear plate member having a first laterally extending edge portion, said edge portion having teeth formed therein engagable with the pinion gear for shifting the rack gear plate member generally laterally as the pinion gear rotates, said rack gear plate member having first and second surfaces, said rack gear plate member extending a substantial distance along the first surface in a direction perpendicular to the path of lateral motion of the rack gear plate member, said first surface being in slidable abutment with the frame;
   a support plate means coupled with the frame and abuttable with the second surface of the rack gear plate member for shiftably securing the rack gear plate member between the support plate and frame for maintaining said teeth in operative engagement with the pinion gear; and
   tie rod means coupled between the rack gear plate member and the steerable ground engaging wheels for steering said wheels as the rack gear plate member shifts laterally.

2. The invention of claim 1, and further comprising laterally outward end portions protruding from the laterally extending edge portion and engagable with the pinion gear for blocking and limiting the lateral shifting of the rack gear plate member.

3. The invention of claim 1, wherein:
   a shoulder portion is coupled with the steering column; and
   the support plate means includes an orifice for receiving the shoulder portion for securing the pinion gear in operative engagement with the teeth formed in the rack gear plate member.

4. The invention of claim 1, wherein the support plate means includes projection means for preventing the rack gear plate member from shifting out of engagement with the pinion gear as the pinion gear rotates.

5. The invention of claim 4, wherein the projection means abuts a second laterally extending edge portion of the rack gear plate member for preventing the rack gear plate member from shifting out of engagement with the pinion gear as the pinion gear rotates.

6. The invention of claim 1, wherein the first laterally extending edge portion is defined by an opening formed in the rack gear plate member.

7. The invention of claim 1, wherein the first laterally extending edge portion is defined by a rearward edge of the rack gear plate member.

8. A rack and pinion steering mechanism, said mechanism being adapted for use with a vehicle having a frame, an operator station, and steerable ground engaging wheels, comprising:
   a rotatable steering wheel carried by the operator station of the vehicle;
   a steering column coupled for rotation with the steering wheel, and having an axis of rotation;
   a pinion gear coupled for rotation with the steering column;
   a rack gear plate member having an opening for receiving the pinion gear, said opening having a laterally extending toothed portion engagable with the pinion gear, said rack gear plate member being shiftable generally laterally as the pinion gear rotates, and having first and second surfaces, said rack gear plate member extending a substantial distance along the first surface in a direction perpendicular to the path of lateral motion of the rack gear plate member, said first surface being in slidable abutment with the frame, and said opening having laterally outward end portions engagable with the pinion gear for limiting the lateral shifting of the rack gear plate member;
   a support plate means coupled with the frame and abuttable with the second surface of the rack gear plate member for shiftably securing the rack gear plate member between the support plate and frame for maintaining said teeth in operative engagement with the pinion gear; and
   tie rod means coupled between the rack gear plate member and the steerable ground engaging wheels for steering the wheels as the rack gear plate member shifts laterally.

9. The invention of claim 8, wherein the tie rods are coupled to the rack gear plate member near the centerline of the vehicle and are coupled to a portion of the rack gear plate member located on the opposite side of the pinion gear from the laterally extending toothed portion.

10. The invention of claim 8, wherein:
a shoulder portion is coupled with the steering column; and
the support plate means includes an orifice for receiving the shoulder portion for securing the pinion gear in operative engagement with the teeth formed in the rack gear plate member.

11. The invention of claim 8, wherein the support plate means includes projection means for preventing the rack gear plate member from shifting out of engagement with the pinion gear as the pinion gear rotates.

12. The invention of claim 11, wherein the projection means abuts a second laterally extending edge portion of the rack gear plate member for preventing the rack gear plate member from shifting out of engagement with the pinion gear as the pinion gear rotates.

13. The invention of claim 8, wherein the rack gear plate member extends longitudinally both fore and aft of the pinion gear, and abuts the frame on both the fore and aft sides of the pinion gear for preventing the rack gear plate member from becoming disengaged from the pinion gear.

14. The invention of claim 13, wherein the support plate means is abuttable with the rack gear plate member on both the fore and aft sides of the pinion gear for preventing the rack gear plate member from becoming disengaged from the pinion gear.

15. The invention of claim 10, wherein:
the support plate means secures the rack gear plate member upwardly against the frame, and
the shoulder portion coupled with the steering column abuts the second surface of the rack gear plate member for preventing the pinion gear from shifting upwardly out of engagement with the laterally extending toothed portion.

16. The invention of claim 10, wherein:
the support plate means secures the rack gear plate member downwardly against the frame, and
the shoulder portion coupled with the steering column abuts the plate for preventing the pinion gear from shifting upwardly out of engagement with the laterally extending toothed portion.

17. A rack and pinion steering mechanism, said mechanism being adapted for use with a vehicle having a frame, an operator station, and ground engaging wheels, comprising:
a rotatable steering wheel carried by the operator station of the vehicle;
a steering column coupled for rotation with the steering wheel, and having an axis of rotation;
a shoulder portion coupled with the steering column;
a pinion gear coupled for rotation with the steering column;
a rack gear plate member having an opening for receiving the pinion gear, said opening having a laterally extending toothed portion engagable with the pinion gear, said rack gear plate member being shiftable generally laterally as the pinion gear rotates, and having first and second surfaces, said rack gear plate member extending a substantial distance along the first surface in a direction perpendicular to the path of lateral motion of the rack gear plate member, said first surface being abuttable with the frame, and said opening having laterally outward end portions engagable with the pinion gear for limiting the lateral shifting of the rack gear plate member, said rack gear plate member extending longitudinally both fore and aft of the pinion gear and abutting the frame on both the fore and aft sides of the pinion gear for preventing the rack gear plate member from becoming disengaged from the pinion gear;
a support plate means coupled with the frame and abuttable with the second surface of the rack gear plate member for shiftably securing the rack gear plate between the support plate and the frame for maintaining said teeth in operative engagement with the pinion gear, said support plate means having an orifice for receiving the shoulder portion for securing the pinion gear in operative engagement with the teeth formed in the rack gear plate member;
projection means coupled with the support plate means and abuttable with a second laterally extending edge portion of the rack gear plate member for preventing the rack gear plate member from shifting out of engagement with the pinion gear as the pinion gear rotates; and
tie rod means coupled between the rack gear plate member and the steerable ground engaging wheels for steering the wheels as the rack gear plate member rotates.

18. The invention of claim 17, wherein;
the support plate means secures the rack gear plate member upwardly against the frame; and
the shoulder portion coupled with the steering column abuts the second surface of the rack gear plate member for preventing the pinion gear from shifting upwardly out of engagement with the laterally extending toothed portion.

19. The invention of claim 17, wherein:
the support plate means secures the rack gear plate member downwardly against the frame; and
the shoulder portion coupled with the steering column abuts the plate for preventing the pinion gear from shifting upwardly out of engagement with the laterally extending toothed portion.

20. A rack and pinion steering mechanism, said mechanism being adapted for use with a vehicle having a frame, an operator station, and steerable ground engaging wheels, comprising:
a rotatable steering wheel positioned within the operator station of the vehicle;
a steering column coupled for rotation with the steering wheel, and having an axis of rotation;
a pinion gear coupled for rotation with the steering column;
a rack gear plate member having a first laterally extending edge portion formed in the rear of the rack gear plate member, said edge portion having teeth formed therein engagable with the pinion gear for shifting the rack gear plate member generally laterally as the pinion gear rotates, said rack gear plate member having first and second surfaces extending forwardly from the pinion gear, said rack gear plate member extending a forwardly a substantial distance along the first surface in a direction perpendicular to the path of lateral motion of the rack gear plate member, said first surface being in slidable abutment with the frame;
a support plate means coupled with the frame and abuttable with the second surface of the rack gear plate member for shiftably securing the rack gear plate member between the support plate and the frame for maintaining said teeth in operative engagement with the pinion gear; and tie rod means coupled between the rack gear plate member and the steerable ground engaging wheels for steering the wheels as the rack gear plate member shifts laterally.

21. The invention of claim 20, and further comprising laterally outward end portions protruding from the first laterally extending edge portion and engagable with the pinion gear for blocking and limiting the lateral shifting of the rack gear plate member.

22. The invention of claim 20, wherein:

a shoulder portion is coupled with the steering column; and the support plate means includes an orifice for receiving the shoulder portion for securing the pinion gear in operative engagement with the teeth formed in the rack gear plate member.

23. The invention of claim 22, wherein the support plate means includes projection means for preventing the rack gear plate member from shifting out of engagement with the pinion gear as the pinion gear rotates.

24. The invention of claim 23, wherein the projection means abuts a laterally extending edge portion of the rack gear plate member for preventing the rack gear plate member from shifting out of engagement with the pinion gear as the pinion gear rotates.

25. The invention of claim 22, wherein:

the support plate means secures the rack gear plate member upwardly against the frame; and the shoulder portion coupled with the steering column abuts the second surface of the rack gear plate member for preventing the pinion gear from shifting upwardly out of engagement with the laterally extending toothed portion.

26. The invention of claim 22, wherein:

the support plate means secures the rack gear plate member downwardly against the frame; and the shoulder portion coupled with the steering column abuts the plate for preventing the pinion gear from shifting upwardly out of engagement with the laterally extending toothed portion.

27. A rack and pinion steering mechanism, said mechanism being adapted for use with a vehicle having a frame, an operator station, and steerable ground engaging wheels, comprising:

a wall formed in the operator station, and having an opening;

a steering column rotatably received by the opening in the wall;

a steering wheel coupled for rotation with the steering column;

a pinion gear coupled for rotation with the steering column;

a rack gear plate member having a laterally extending toothed portion engagable with the pinion gear, said rack gear plate member being shiftable generally laterally as the pinion gear rotates;

a support plate means coupled with the frame and abuttable with the rack gear plate member for shiftably securing the rack gear plate member between the support plate and the frame for maintaining said teeth in operative engagement with the pinion gear;

tie rod means coupled between the rack gear plate member and the steerable ground engaging wheels for steering the wheels as the rack gear plate member rotates;

a compression spring carried about the steering column and in compression between the steering wheel and the wall formed in the operator station for biasing the steering column upwardly;

a shoulder portion coupled with the lower portion of the steering column and abuttable with the rack gear plate member for blocking the steering column from shifting upwardly along the steering column's axis of rotation.

* * * * *